United States Patent [19]
Jolly

[11] Patent Number: 5,863,623
[45] Date of Patent: Jan. 26, 1999

[54] BARK ENCASED PLASTIC SHEETING

[75] Inventor: Frank H. Jolly, Arcata, Calif.

[73] Assignee: Arcata Community Recycling Center, Arcata, Calif.

[21] Appl. No.: 634,766

[22] Filed: Apr. 19, 1996

[51] Int. Cl.⁶ .............. B32B 5/02; B32B 31/30; B44F 9/02
[52] U.S. Cl. .............. 428/15; 428/106; 428/113; 428/151; 442/62
[58] Field of Search .............. 428/15, 18, 106, 428/113, 151; 442/62, 70, 394

[56] References Cited

U.S. PATENT DOCUMENTS

| | | | |
|---|---|---|---|
| 2,550,143 | 4/1951 | Eger | 524/14 X |
| 2,968,104 | 1/1961 | Ito | 428/16 X |
| 3,390,127 | 6/1968 | Schick et al. | 524/14 X |
| 3,652,360 | 3/1972 | Hartman et al. | 428/461 X |
| 3,870,583 | 3/1975 | Gidge | 428/17 X |
| 3,927,235 | 12/1975 | Chow | 428/302 |
| 4,246,310 | 1/1981 | Hunt et al. | 428/106 |
| 4,255,477 | 3/1981 | Holman | 428/106 |
| 4,361,612 | 11/1982 | Shaner et al. | 428/106 |
| 4,364,984 | 12/1982 | Wentworth | 428/106 |
| 4,393,828 | 7/1983 | Jolly | 123/203 |
| 4,569,873 | 2/1986 | Robbins | 428/106 |
| 4,841,809 | 6/1989 | Jolly | 475/163 |
| 5,106,666 | 4/1992 | Fitzgerald et al. | 428/106 X |
| 5,215,625 | 6/1993 | Burton | 428/903.3 X |
| 5,234,370 | 8/1993 | Shapero et al. | 428/16 X |
| 5,307,538 | 5/1994 | Rench et al. | 15/352 |
| 5,363,535 | 11/1994 | Rench et al. | 15/344 |
| 5,382,461 | 1/1995 | Wu | 442/62 X |
| 5,404,609 | 4/1995 | Rench et al. | 15/52.1 |
| 5,415,943 | 5/1995 | Groger et al. | 428/106 X |
| 5,423,603 | 6/1995 | Reynolds et al. | 366/208 |
| 5,425,976 | 6/1995 | Clarke et al. | 428/105 |
| 5,470,631 | 11/1995 | Lindquist et al. | 428/105 |
| 5,470,632 | 11/1995 | Meldner et al. | 428/105 X |
| 5,489,460 | 2/1996 | Clarke et al. | 428/106 |

Primary Examiner—Henry F. Epstein

[57] ABSTRACT

A plastic sheet is extruded and a layer of redwood, cedar or other bark which has been finely separated is hot rolled into the two faces. The bark is decorative and also protects the sheets from ultraviolet light destruction. The sheets can then be hot worked into corrugated, design-embossed sheets and into many tubular or other hollow or open-sided shapes.

4 Claims, 1 Drawing Sheet

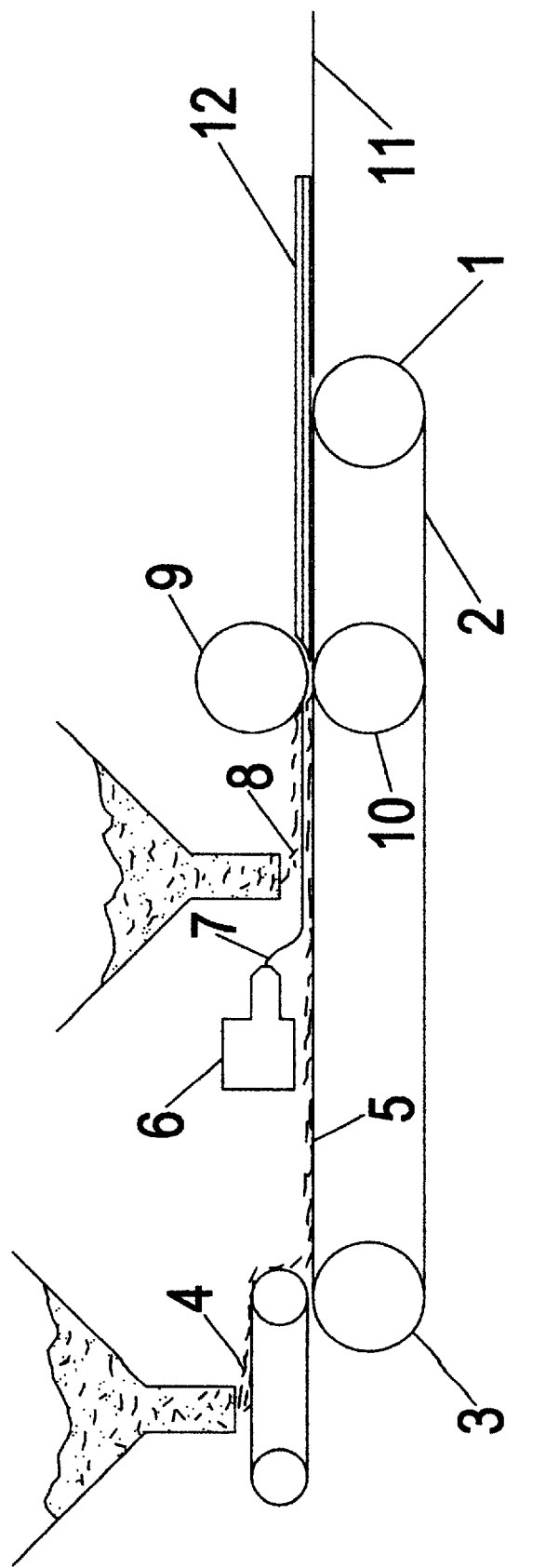

BARK ENCASED PLASTIC SHEETING

BACKGROUND OF THE INVENTION

This invention is different from the normal invention of plywood panels in that the plastic has traditionally been used to bind different layers of wood veneers together. However in this invention, the recycled or virgin plastic sheet is protected with a facing of highly weather-resisting redwood, cedar or other bark.

The bark has been shredded and otherwise reduced to workable fibers. The fibers are uniformly distributed and hot pressed into the surface impregnating plastic giving it a bark look, and imparting to the plastic a long lasting, cheap and easily obtained ultraviolet protection or coating.

The following U.S. prior patents have been found in searches, but all of them use the plastic to hold together wood products. This patent uses wood products to protect and decorate plastic. Prior patents are U.S. Pat. Nos.: 4,246,310; 4,255,477; 4,361,612; 4,364,984; 4,569,873; 5,106,666; 5,415,943; 5,425,976; 5,470,631; 5,489,460.

SUMMARY OF THE INVENTION

The present invention provides a highly weather resistant sheet that can be hot worked into a multitude of shapes for different uses. Some shapes include: shingles, corrugated sheeting, fencing panels, artificial redwood ties, square or round posts which can be filled with concrete and siding for rustic homes, etc.

This invention provides a way to use a great quantity of the recycled plastic that is available. The polyethylenes and other readily available recycled plastics are easily destroyed by ultraviolet light and are often of different colors or shades.

The redwood, cedar or other bark fibers coat the surface and/or the fibers are impregnated by the plastic providing protection and attractive appearance to any type or color of remelted plastic scrap or virgin plastic.

BRIEF DESCRIPTION OF THE DRAWING

FIG. 1. View of three layers being laid down and hot rolled into a pressed sheet.

DETAILED DESCRIPTION OF THE INVENTION

A highly weather resistant decorative and sturdy panel according to the present invention comprises an extruded plastic sheet which has been coated or impregnated on one or both sides by a layer of hot rolled redwood, cedar or other bark.

The bark is previously shredded into workable fibers. The bark fibers 4 are evenly distributed onto a movable belt 2 that is synchronized to the output flow of a plastic sheet extruder 6. The moving belt is driven by roller 1, idles around roller 3, and is supported at 5. The plastic sheet 7 is continuously extruded in uniform thickness and temperature onto the layer of bark fibers.

A second layer of bark 8 is then distributed on top of the moving layer of plastic 7.

The second layer of bark 8 is optional. If it is included, then the three layer sheet is fed into the pressing rolls 9 & 10. The pressing rolls hot work the sheet and press the three layers together coating the plastic and impregnating the fibers. If the second layer of bark 8 is not used, the top pressing roll 9 is sprayed or coated with a release agent and the two layer sheet is hot rolled to work the bark into the sheet's surface.

The finished sheet 12 is then fed onto an out-feed table 11 where it is either cooled or sent into a press. The press can be of several types: a roller press with corrugation rollers, other forming rollers, or slitting rolls which work the sheet into other shapes and sizes. The sheets can also be cut to length by a flying shear or flying saw and then fed into a platen-type press where the sheets can be deep drawn into many shapes.

The secondary working equipment described herein is not a part of this patent as they are all readily available in the common domain.

What is claimed is:

1. A bark fiber encased plastic sheet comprising a layer of plastic, said plastic sheet was extruded at the elevated temperature of extrusion in the range of 200° F. to 650° F., said plastic sheet having fibers of redwood bark worked into at least one surface, said plastic sheet having been coated on said at least one surface with a layer of fibers from redwood bark, said plastic sheet was allowed to cool to ambient temperature.

2. A bark fiber encased plastic sheet of claim 1 comprising a layer of plastic, said plastic sheet was extruded at the elevated temperature of extrusion in the range of 200° F. to 650° F., said plastic sheet having fibers of redwood bark worked into both surfaces, said plastic sheet having been coated on both surfaces with a layer of fibers from redwood bark, said plastic sheet was allowed to cool to ambient temperature.

3. A bark fiber encased plastic sheet of claim 1 wherein said plastic was selected from a group of plastics consisting of virgin plastic, plastic scrap and recycled plastic, said plastic sheet was extruded at the elevated temperature of extrusion in the range of 200° F. to 650° F., said plastic sheet having fibers of redwood bark worked into at least one surface, said plastic sheet having been coated on said at least one surface with a layer of fibers from redwood bark, said plastic sheet was allowed to cool to ambient temperature.

4. A bark fiber encased plastic sheet comprising a layer of plastic, said plastic sheet was extruded at the elevated temperature of extrusion in the range of 200° F. to 650° F., said plastic sheet having tree bark fibers worked into at least one surface, said plastic sheet having been coated on said at least one surface with a layer of fibers from tree bark, said plastic sheet was allowed to cool to ambient temperature.

* * * * *